US006959356B2

(12) United States Patent
Packwood et al.

(10) Patent No.: US 6,959,356 B2
(45) Date of Patent: Oct. 25, 2005

(54) MULTI-PROTOCOL FIELD DEVICE AND COMMUNICATION METHOD

(75) Inventors: Steve Packwood, Lincoln, NE (US); Brent H. Larson, Dallas, TX (US); Larry K. Brown, Marshalltown, IA (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 538 days.

(21) Appl. No.: 09/918,258

(22) Filed: Jul. 30, 2001

(65) Prior Publication Data

US 2003/0023795 A1 Jan. 30, 2003

(51) Int. Cl.$^7$ .......................... G06F 13/00; G06F 17/00
(52) U.S. Cl. .............................. 710/315; 700/1; 710/10
(58) Field of Search ................................. 710/305, 315, 710/8–19, 62–74; 700/1, 9, 75

(56) References Cited

U.S. PATENT DOCUMENTS

| | | | | |
|---|---|---|---|---|
| 5,764,891 A | * | 6/1998 | Warrior ........................ | 710/72 |
| 5,828,851 A | | 10/1998 | Nixon et al. ................ | 395/285 |
| 5,923,557 A | * | 7/1999 | Eidson ......................... | 700/129 |
| 6,192,281 B1 | | 2/2001 | Brown et al. .................. | 700/2 |
| 6,266,726 B1 | * | 7/2001 | Nixon et al. ................. | 710/105 |
| 6,449,715 B1 | * | 9/2002 | Krivoshein .................... | 713/1 |
| 6,629,059 B2 | * | 9/2003 | Borgeson et al. ............ | 702/183 |
| 2002/0167904 A1 | * | 11/2002 | Borgeson et al. ............ | 370/241 |
| 2004/0073402 A1 | * | 4/2004 | DeLaCruz et al. ........... | 702/183 |

FOREIGN PATENT DOCUMENTS

WO    WO 01 23971 A    4/2001

OTHER PUBLICATIONS

PCT International Search Report issued in PCT/US02/21698 dated Dec. 16, 2002.

* cited by examiner

*Primary Examiner*—Glen A. Auve
(74) *Attorney, Agent, or Firm*—Marshall, Gerstein & Borun LLP

(57) ABSTRACT

A multi-protocol smart field device uses a Fieldbus communication protocol to communicate process control information and uses a HART communication protocol to enable local configuration of the field device via a hand-held HART communicator. The multi-protocol smart field device includes a first communications interface communicatively coupled to a digital data bus that is adapted to process HART communications which are received from and which are sent to a HART hand-held communicator. The multi-protocol smart field device further includes a second communications interface communicatively coupled to the digital data bus that is adapted to process Fieldbus communications. Additionally, the multi-protocol smart field device includes a first filter coupled between the first communications interface and the digital data bus that substantially attenuates signals having frequencies associated with Fieldbus communications and a second filter coupled between the second communications interface and the digital data bus that substantially attenuates signals having frequencies associated with HART communications.

32 Claims, 6 Drawing Sheets

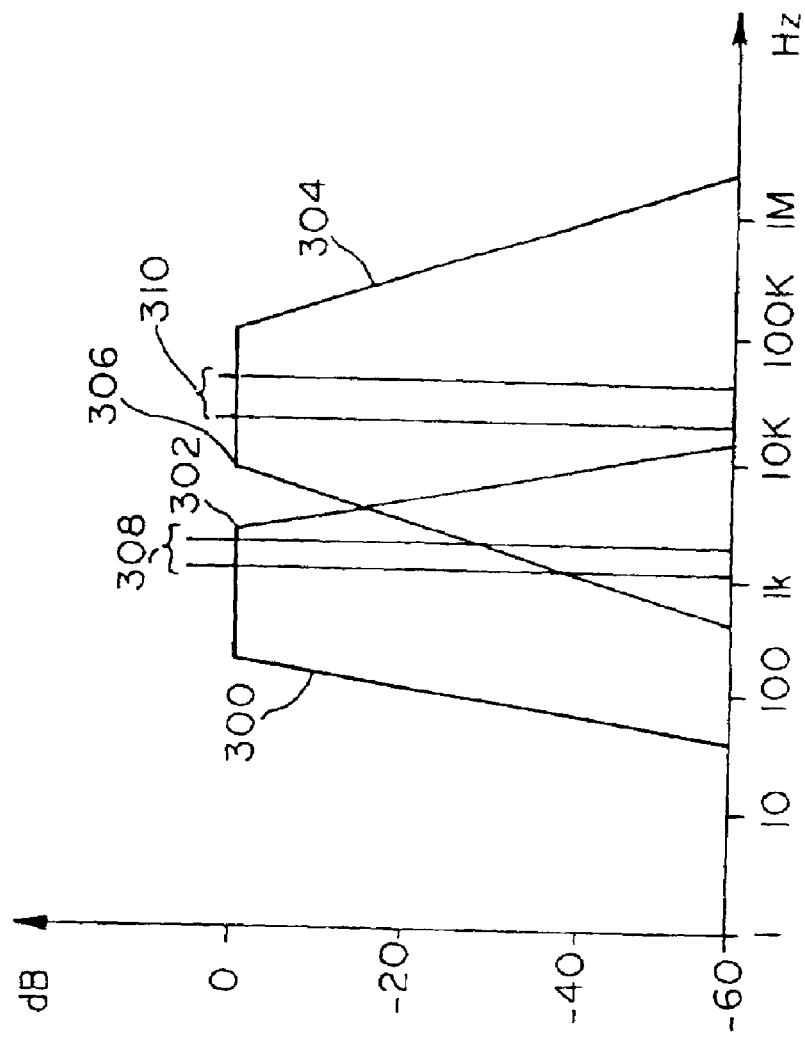

MULTI-PROTOCOL FIELD DEVICE AND COMMUNICATION METHOD

FIELD OF THE INVENTION

The present invention relates generally to field devices and more specifically, to a smart field device that uses first and second communication protocols to communicate process control information and configuration information.

DESCRIPTION OF THE RELATED ART

Modem process control systems are typically microprocessor-based distributed control systems (DCSs). A traditional DCS configuration includes one or more user interface devices, such as workstations, connected by a data bus (e.g., Ethernet) to one or more controllers. The controllers are generally physically close to a controlled process and are connected to numerous electronic monitoring devices and field devices such as electronic sensors, transmitters, current-to-pressure transducers, valve positioners, etc. that are distributed throughout the process.

In a traditional DCS, control tasks are distributed by providing a control algorithm within each of the controllers. The controllers independently execute the control algorithms to control the field devices coupled to the controllers. This decentralization of control tasks provides greater overall system flexibility. For example, if a user desires to add a new process or part of a process to the DCS, the user can connect an additional controller (having an appropriate control algorithm) to sensors, actuators, etc. within the process control system. Alternatively, if the user desires to modify an existing process, new control parameters or control algorithms may, for example, be downloaded from a user interface to an appropriate controller via the data bus.

To provide improved modularity and inter-manufacturer compatibility, process controls manufacturers have more recently moved toward further decentralization of control within a process. These more recent approaches are based on smart field devices that communicate using an open (i.e., non-proprietary) protocol such as the HART®, PROFIBUS®, WORLDFIP®, Device-Net®, CAN, and Foundation™ Fieldbus (hereinafter "Fieldbus") protocols. These smart field devices are microprocessor-based devices such as sensors, actuators, etc. that, in some cases, such as with Fieldbus devices, also perform control loop functions traditionally executed by a DCS controller. Because smart field devices provide control capability and communicate using an open protocol, smart field devices from a variety of manufacturers can typically communicate with one another via a common digital data bus and can interoperate to execute a control loop without the intervention of a DCS controller.

The configuration of smart field devices is typically accomplished from a central location such as a host system or workstation within the process control system or, alternatively, may be accomplished locally at the field devices using a portable configuration tool such as a personal computer (e.g., a laptop computer), which typically includes a communications interface card for sending and receiving communications to the field devices using the particular communication protocol employed by the smart field devices. Additionally, because it is often highly advantageous or it is a requirement to locally configure a field device to ensure that the field device is properly configured and is functioning as desired, some manufacturers provide a special purpose hand-held communicator that may be used to locally configure some types of smart field devices. For example, hand-held communicators that use the HART communication protocol are widely available.

It is commonly understood that locally configuring field devices substantially minimizes or eliminates the possibility that an improperly configured or malfunctioning field device will cause injury to personnel and/or damage to property. Furthermore, traditional hand-held communicators are typically less expensive, more compact, lighter, more resistant to environmental stresses, etc. than a portable personal computer and, thus, these hand-held communicators may be used to effectively supervise the local configuration of smart field devices in a more cost effective and convenient manner.

However, in the case of smart field devices that use the Fieldbus communication protocol (i.e., Fieldbus devices), local configuration is particularly difficult because hand-held communicators that communicate using the Fieldbus protocol (which are similar to those available for use with smart field devices that communicate using the HART protocol) are not currently available. As a result, to locally configure smart field devices that use the Fieldbus communication protocol, technicians must use a portable personal computer having a specialized Fieldbus interface card that enables the personal computer to send and receive information using the Fieldbus protocol.

Unfortunately, due to the relatively high cost, the lack of environmental robustness and the inconvenience associated with having to use a portable personal computer to carry out the local configuration of conventional Fieldbus devices, field technicians, system operators, etc. may, despite the above-noted risks, instead choose to configure smart field devices, such as Fieldbus devices, from a central location within the process control system such as a host or workstation, if one is available. However, in situations where the process control system does not have a central host or workstation or in situations where the system host or workstation is inoperative, field technicians may nevertheless be compelled to use a portable personal computer to carry out the configuration of smart field devices, regardless of the high costs and inconveniences incurred.

SUMMARY OF THE INVENTION

A smart field device uses a first communication protocol to communicate process control information but may be configured using a second communication protocol that is different from the first communication protocol. Generally speaking, the multi-protocol field device described herein may be locally configured using a readily available and inexpensive hand-held communicator such as, for example, a HART communicator and may communicate process control information and carry out process control activities using another communication protocol, such as the Fieldbus protocol. As a result, the multi-protocol field device described herein enables a process control system designer to implement systems using smart field devices that can communicate process control information to each other and to a central host or workstation using a relatively high speed digital protocol (such as the Fieldbus protocol) and that can be locally configured using a relatively low speed communication protocol (such as the HART protocol). Because the multi-protocol field device described herein may be configured using a low speed communication protocol such as, for example, the HART protocol, the multi-protocol field device does not have to be configured using a portable personal computer. Instead, the multi-protocol field device described herein may be configured using an inexpensive and compact hand-held communicator, such as a HART communicator, which is readily available and which is commonly used to locally configure conventional single protocol smart field devices that use the HART protocol.

In accordance with one aspect of the invention, a field device for use in a process control system having a digital data bus includes a first communications interface communicatively coupled to the digital data bus that is adapted to process communications having a first protocol. The field device further includes a second communications interface communicatively coupled to the digital data bus that is adapted to process communications having a second protocol different from the first protocol.

Additionally, the field device includes a memory and a processor communicatively coupled to the memory, the first communications interface and the second communications interface. The processor is programmed to process the communications having the first protocol and the communications having the second protocol and may be further programmed to use the communications having the first protocol for process control and to use the communications having the second protocol for configuration of the field device. In some embodiments, the first communications interface may be further adapted to process communications having a first frequency band and the second communications interface may be further adapted to process communications having a second frequency band different than the first frequency band.

In accordance with another aspect of the invention, a method of communicating with a field device coupled to a digital data bus includes the steps of receiving communications having a first protocol in the field device via the digital data bus and receiving communications having a second protocol different from the first protocol in the field device via the digital data bus. The method further includes the steps of processing the communications having the first protocol within a first communications interface communicatively coupled to the digital data bus and processing the communications having the second protocol within a second communications interface communicatively coupled to the digital data bus.

In accordance with still another aspect of the invention, a method of locally configuring a field device having a first communications interface for processing communications having a first protocol and a second communications interface for processing communications having a second protocol using a portable configuration tool includes the steps of communicatively coupling the portable configuration tool to the field device and sending configuration information from the portable configuration tool to the field device using the second communication protocol.

BRIEF DESCRIPTION OF THE DRAWINGS

FIG. 6 is an exemplary graphical representation of frequency response characteristics that may be provided by the filter blocks shown in FIG. 2.

DESCRIPTION OF THE PREFERRED EMBODIMENTS

While a multi-protocol smart field device and method of communicating with a multi-protocol smart field device is described herein as using the Fieldbus and HART communication protocols, additional and/or different communication protocols could be used instead without departing from the scope and the spirit of the invention. Before discussing the details of the invention, a general description of the Fieldbus protocol, field devices configured according to this protocol, and the way in which communication occurs in a process control system that uses the Fieldbus protocol will be provided. However, it should be understood that, while the Fieldbus protocol is a relatively new digital communication protocol developed for use in process control systems, this protocol is well known in the art and is described in detail in numerous articles, brochures and specifications published, distributed, and available from, among others, the Fieldbus Foundation, a non-profit organization headquartered in Austin, Tex.

The Fieldbus protocol is an all-digital, serial, two-way communication protocol that provides a standardized physical interface to a two or four-wire loop or bus interconnecting field equipment such as sensors, actuators, controllers, valves, etc. that may, for example, be located in an instrumentation or process control environment of a factory or a plant. The Fieldbus protocol provides a local area network for field devices within a process to enable these field devices to interoperate and perform control functions at locations distributed throughout the process and to communicate with one another before and after the performance of these control functions to implement an overall control strategy.

Figure 1:
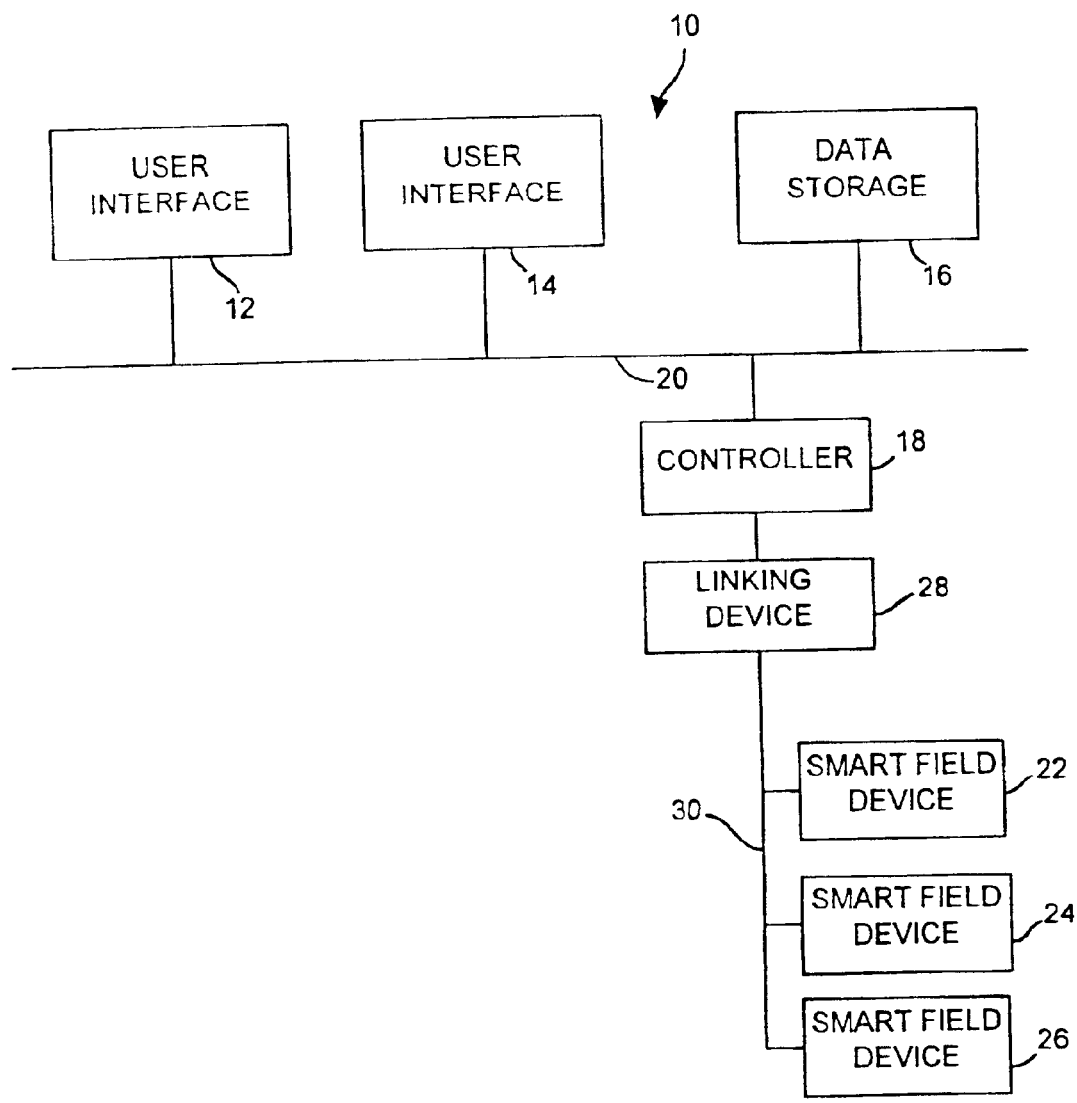
FIG. 1 is an exemplary schematic block diagram of a process control system that uses smart field devices to perform process control activities.

FIG. 1 illustrates an exemplary process control system 10 that uses smart field devices to perform process control activities. The process control system 10 includes user interfaces 12 and 14, which may be, for example, workstations connected in a communication network to a number of other devices such as a data storage device 16 and a controller 18 via a system level data bus 20. The system level data bus 20 may be an Ethernet databus or any other databus suitable for the transmission of data. The controller 18 may be, for example, a DCS controller and may communicate with the user interfaces 12 and 14 using a proprietary communication protocol, or in any other suitable manner, via the system level data bus 20. For example, the controller 18 may send alarm and status information to the user interfaces 12 and 14 and may additionally receive user commands/requests from the user interfaces 12 and 14 via the system data bus 20. The controller 18 may further include control algorithms for use in controlling field devices that are connected to the controller 18 in any conventional or any other desired manner.

In particular, the controller 18 is in communication with smart field devices 22–26 via a linking device 28, which may be, for example, an input/output (I/O) card for the Fieldbus protocol. The field devices 22–26 are connected in a communication network via a digital data bus 30 that uses a non-proprietary communication protocol. The field devices 22–26 communicate with one another and the linking device 28 to execute one or more process control loops either in conjunction with or independently from the controller 18. The smart field devices 22–26 may be, for example, Fieldbus compatible devices, in which case the data bus 30 employs the Fieldbus signal protocol. However, other types of devices and protocols could be used as well. For example, Profibus compatible devices may be used for some or all of the field devices 22–26. In that case, the Profibus compatible devices may be configured to respond only to commands from the controller 18. In other words, the devices 22–26 may not be configured to send commands to (i.e., to interoperate with) each other.

While the smart field devices 22–26 illustrated in FIG. 1 are connected to the data bus 30 in a standard multi-drop configuration, in which multiple devices are connected in parallel to the same pair of data bus wires, the Fieldbus protocol allows other device/wire topologies including point-to-point connections, in which each device is connected to a controller or a host via a separate two-wire pair (similar to 4–20 mA analog DCS systems), and tree or "spur" connections in which each device is connected to a common point in a two or four-wire bus that may be, for example, a junction box or a termination area in one of the field devices within a process control system.

Each of the smart field devices 22–26 is capable of communicating over the digital data bus 30 and is capable of independently performing one or more process control functions using data acquired by the field device from the process or from a different field device via communication signals on the bus 30. In particular, Fieldbus devices are capable of directly implementing portions of an overall control strategy that, in the past, were performed entirely within a DCS controller.

As will be discussed in greater detail below, one or more of the smart field devices 22–26 may be a multi-protocol field device that communicates process control information using the Fieldbus protocol, for example, and that uses another communication protocol for configuration purposes. By way of example only, the communication protocol used to configure the multi-protocol smart field device may be the HART communication protocol. Thus, the multi-protocol smart field device described herein can communicate process control information and can carry out process control activities at a relatively high speed and with a high accuracy using the Fieldbus protocol and can be locally configured using a readily available, inexpensive, relatively low speed HART communicator, thereby eliminating the need to use a portable personal computer to carry out a local configuration. Of course, the multi-protocol smart field device described herein may, for example, perform configuration activities using the Profibus communication protocol instead of or in addition to the HART communication protocol.

Figure 2:
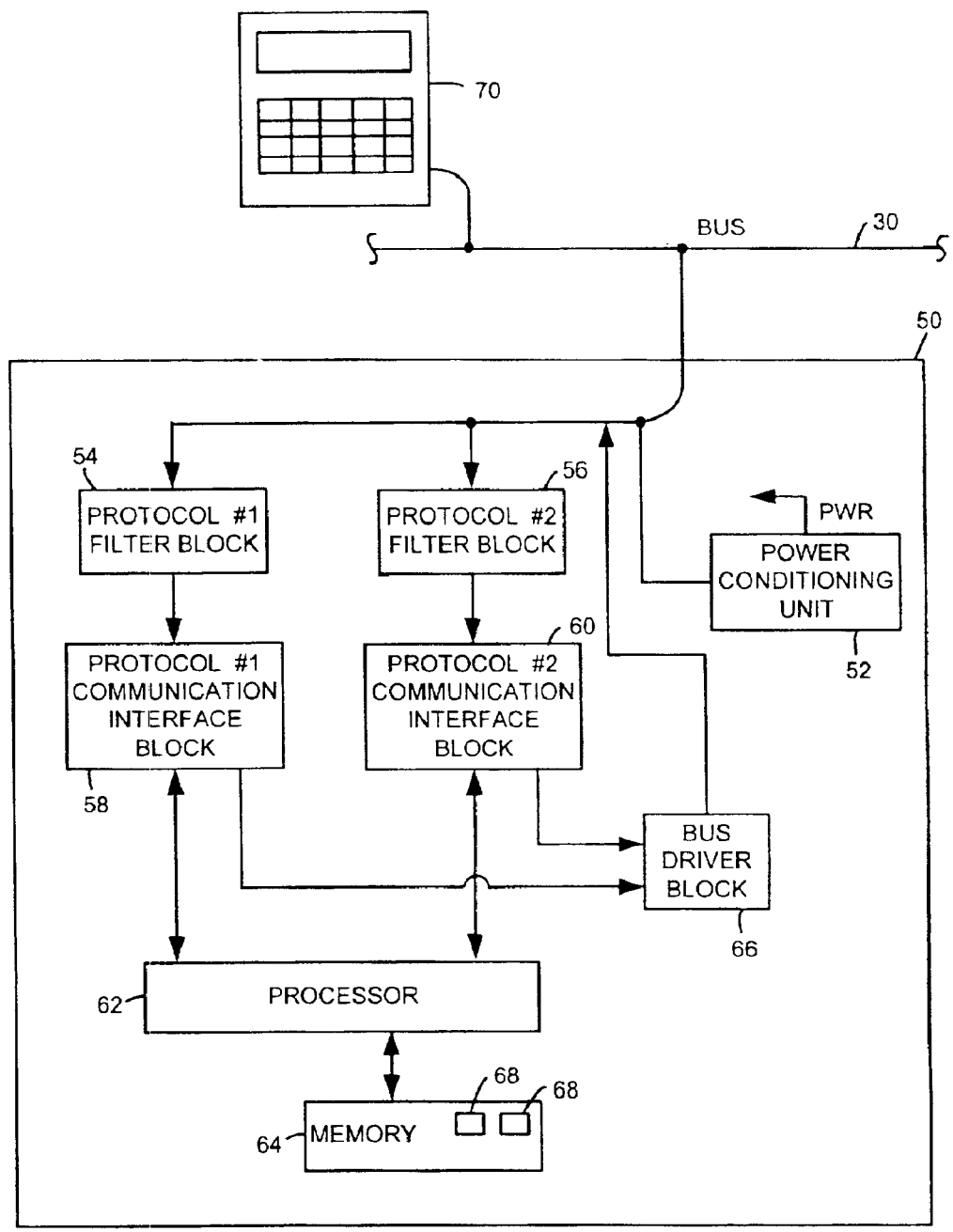
FIG. 2 is an exemplary schematic block diagram of a multi-protocol smart field device that may be used within the process control system shown in FIG. 1.

FIG. 2 is an exemplary schematic block diagram of a multi-protocol smart field device 50 that may be used within the process control system 10 shown in FIG. 1. The field device 50 includes a power conditioning unit 52, first and second filters 54 and 56, first and second communications interface blocks 58 and 60, a processor 62, a memory 64 communicatively coupled to the processor 62, and a bus driver block 66.

As is well known, in the case where the bus 30 uses the Fieldbus protocol, the unregulated bus voltage may vary between about 9 volts direct current (VDC) and 32 VDC. The power conditioning unit 52 receives this unregulated voltage and uses conventional or any other suitable shunting and regulation techniques to provide a relatively constant current and voltage supply to the circuitry within the field device 50 which, generally speaking, requires a relatively constant current from the bus 30. For example, a regulated voltage of about 5 VDC may be provided to the processor 62, the memory 64, the communications interface blocks 58 and 60, or any other circuitry or functional blocks within the field device 50. Additionally, the power conditioning unit 52 may provide additional and/or different regulated voltages and currents as needed using conventional or any other power conditioning techniques.

Practically speaking, although the multi-protocol smart field device 50 may be capable of carrying out communications using more than one protocol, the field device 50 is preferably, but not necessarily, adapted for primary physical compatibility with at least one particular protocol. In other words, because the manner in which power is supplied to field devices may vary substantially with the particular protocol being used, the field device 50 may have to adopt one particular physical interface to draw power from the bus 30. Furthermore, the number of communication lines, power lines, etc. may vary significantly between protocols and, in some cases, such as with the Fieldbus protocol, may even vary between implementations of the protocol. For example, Fieldbus power may be supplied along with communication signals using a conventional loop-powered technique. Alternatively, Fieldbus power may be supplied using one or more lines, which are separate from the communication lines.

The first communications interface 58 is communicatively coupled to the bus 30 through the first filter 54. Preferably, but not necessarily, the first communications interface block 58 is adapted to process communications based on the HART communication protocol. As is well known, the HART communication protocol specifies the manner in which digital information is arranged in digital packets (i.e., HART packets) and the manner in which the digital packets are physically conveyed through the transmission media, which is typically a wire. Because the specifics of the HART protocol are well documented in widely available literature, a more detailed discussion of the HART protocol is not provided herein. The HART communications received by the first communications interface 58 are processed (i.e., demodulated, decoded, etc.) and the messages contained within the HART communications are sent to the processor 62 for further processing. The messages sent using HART communications may be used to configure the operation of the field device 50, may initiate some activity by the field device 50, may cause the field device 50 to cease performing some activity, etc. Of course, the first communications interface 58 could be adapted to process communications based on another communication protocol that is similar to or different from the HART protocol.

As will be discussed in greater detail below, to prevent non-HART signals present on the bus 30 from interfering with the activities of the first communications interface 58, the filter 54 is adapted to substantially attenuate signals having frequencies that fall outside the frequency band or range typically associated with HART communications. For example, the filter 54 may be adapted to couple communications having frequencies in the range of between about 1 kilohertz (kHz) and 2.2 kHz, which is the frequency range associated with HART communications, without any significant attenuation, while signals having frequencies of greater than about 2.2 kHz and less than about 1 kHz may be substantially attenuated.

The second communications interface 60 is communicatively coupled to the digital data bus 30 through the second filter 56. Preferably, but not necessarily, the second communications interface 60 is adapted to process communications based on the Fieldbus protocol. As with the HART protocol, the Fieldbus protocol specifies the manner in which digital data is arranged in packets and the manner in which the packets are physically transmitted via the data bus 30. As discussed in more detail below, the second communications interface 60 includes circuitry that retrieves digital information from a Fieldbus data stream and conveys this digital information to the processor 62 for further processing. Additionally, the second communications interface 60 includes circuitry that can process digital communications received from the processor 62 to create a data stream in accordance with the Fieldbus protocol that may be transmitted via the bus 30.

The second filter 56 is adapted to substantially attenuate non-Fieldbus signals (e.g., HART communications) present on the bus 30 and to couple any Fieldbus communications to the second communications interface 60 substantially unattenuated. As is well known, the Fieldbus protocol typically uses a data transmission rate of about 31.25 kilobits per second, which is significantly greater than the data rate and frequency band associated with HART communications. Thus, because the first filter 54 substantially attenuates signals having frequencies associated with Fieldbus communications and because the second filter substantially attenuates signals having frequencies associated with the HART protocol, both HART and Fieldbus communications may be present on the same pair of wires of the bus 30 at the same time without disrupting the processing activities of either of the communications interfaces 58 and 60.

The processor 62 may receive communications from the communications interfaces 58 and 60 via one or more data ports. For example, communications from the first communications interface 58 may enter the processor 62 through a first serial port, while communications from the second communications interface 60 enter the processor 62 through a second serial port. Alternatively, the processor 62 may actively control a selection circuit (e.g., a multiplexer) to route the communications from either of the first and second communications interfaces 58 and 60 to a single input port. In any event, the processor 62 can distinguish between Fieldbus and HART communications based on which port is receiving the communications and/or which of the communications interfaces 58 and 60 is currently being routed by the selection circuitry to the processor 62.

The processor 62 may use one or more software routines 68 to process and respond to the communications received from the communications interfaces 58 and 60. In particular, the software routines 68 may include known processing methods for processing HART communications and Fieldbus communications. Such processing methods are well known in the art and, thus, will not be described further herein.

In response to HART communications sent to the field device 50 by, for example, a hand-held HART communicator 70, the processor 62 may send responsive HART communications to the first communications interface 58, which may further process and/or signal condition the responsive HART communications and then send the processed and/or signal conditioned responsive HART communications to the bus driver 66. Similarly, in response to Fieldbus communications sent to the field device 50 by, for example, other field devices, workstations, etc. within the process control system 10 (FIG. 1), the processor 62 may send responsive Fieldbus communications to the second communications interface 60, which may further process and/or signal condition the responsive Fieldbus communications prior to sending them to the bus driver 66. The bus driver 66 may use conventional signal conditioning techniques such as, for example, level shifting, current amplification, etc., or any other suitable signal conditioning techniques to convey the responsive HART and Fieldbus communications via the bus 30.

By way of example only, the multi-protocol smart field device 50 may carry out process control activities and communicate process control information via the bus 30 using only Fieldbus communications. For example, one or more of the smart field devices 22–26 (FIG. 1) may be a multi-protocol smart field device like the field device 50 shown in FIG. 2 and, as a result, may interoperate with other multi-protocol or conventional single protocol smart field devices to carry out process control activities within the system 10. Of course, the multi-protocol field device 50 may use Fieldbus communications for any other standard or known purpose, such as configuration, if desired. Additionally, the multi-protocol smart field device 50 may communicate with the HART hand-held communicator 70 that is communicatively coupled to the bus 30. Preferably, but not necessarily, the HART communicator 70 may be used to configure the field device 50, in which case the HART communications containing configuration information pass through the first filter 54 and the first communications interface 58.

Figure 3:
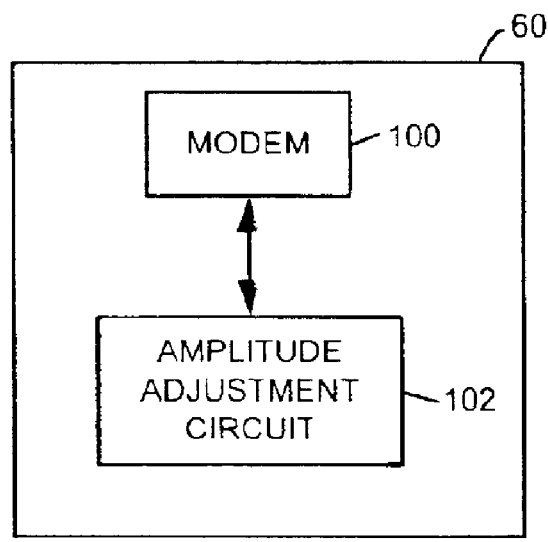
FIG. 3 is a more detailed schematic block diagram of the first communications interface block shown in FIG. 2.

FIG. 3 is a more detailed schematic block diagram of the first communications interface 58 that may be used within the multi-protocol smart field device 50 shown in FIG. 2. As shown in FIG. 3, the first communications interface 58 includes a modem 100 (i.e., a modulator/demodulator) and an amplitude adjustment circuit 102. As is well known, the HART communication protocol transmits digital information using a frequency shift keying technique that may, for example, transmit a logical low (i.e., a "0") using a 2.2 kHz signal and may transmit a logical high (i.e., a "1") using a signal having a frequency of about 1.2 kHz. As is well known, the HART protocol is based on a master-slave communication scheme whereby a slave device only communicates to a master device when the slave device is addressed by the master device. Of course, those skilled in the art will recognize that any of a variety of conventional modem units may be used to implement the modem 100 within the first communications interface 58.

When HART communications are sent to the smart field device 50 via the bus 30 (using, for example, the HART hand-held communicator 70), the first communications interface 58 uses the modem 100 to demodulate the HART signals to form a digital data stream including digital words that can be processed by the processor 62 using one or more of the routines 68. Conversely, when the processor 62 sends responsive HART communications to the hand-held communicator 70, a digital data stream, which is composed of configuration information or any other information that has been encoded using the HART protocol, is sent via an output port of the processor 62 to the modem 100. The modem 100 then modulates the digital data stream according to the HART protocol (i.e., using different frequencies to represent logical one and logical zero) and sends this modulated data stream to the amplitude adjustment circuit 102. The amplitude adjustment circuit 102 controls the level of the modulated signal that is sent to the bus driver block 66 and the bus driver block 66 performs any waveshaping, level shifting, current amplification, etc. that is required to drive a HART compliant signal on the bus 30.

Figure 4:
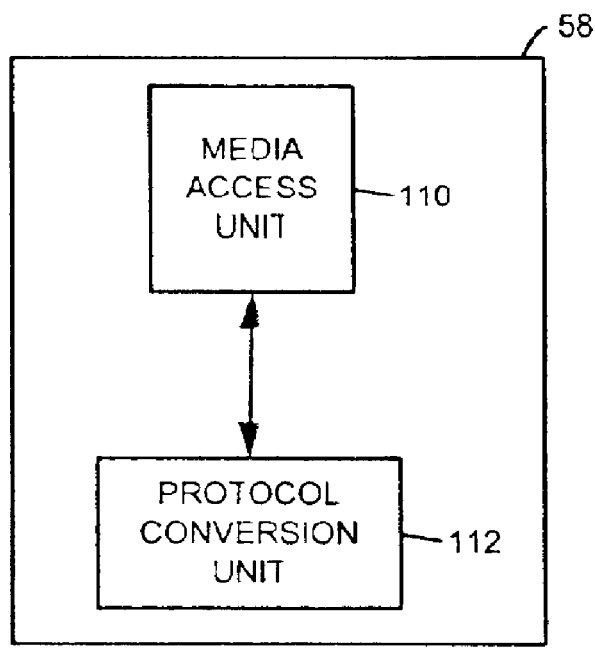
FIG. 4 is a more detailed schematic block diagram of the second communications interface block shown in FIG. 2.

FIG. 4 is a more detailed schematic block diagram of the second communications interface 60 shown in FIG. 2. As shown in FIG. 4, the second communications interface 60 includes a media access unit 110 coupled to a protocol conversion unit 112. The media access unit 110 receives a Fieldbus signal from the bus 30 (after it has passed through the second filter 56) and extracts a digital bitstream, a clock signal and a data valid signal which, as is well known in the art, are components of a Fieldbus signal. The media access unit 110 may filter out DC voltages, noise signals, or any other signals that are contained within the Fieldbus signal (or coupled to the Fieldbus signal) and which are not needed for subsequent processing of the information contained within the Fieldbus signal.

The protocol conversion unit 112 receives the extracted bitstream, a data valid signal and clock signals from the media access unit 110 and converts the bitstream into digital words that can be processed by one or more of the routines 68. Generally speaking, the protocol conversion unit 112 may be implemented using a commercially available integrated circuit that uses known techniques to decode the bitstream that has been extracted from the Fieldbus signal. The digital words that are decoded from the bitstream may then be processed by the processor 62 as Fieldbus commands, data, etc. and appropriate responsive communications may be generated by the processor 62 using one or more of the routines 68.

Responsive communications from the processor 62 may also be routed through the protocol conversion unit 112 and the media access unit 110 to generate responsive Fieldbus communications on the bus 30. To send these responsive communications, the protocol conversion unit 112 converts digital words received from the processor 62 into a bitstream according to the Fieldbus protocol and the media access unit 110 embeds this bitstream in a Fieldbus compatible signal using known waveshaping techniques. As is well known, the Fieldbus protocol requires the bitstream to be encoded using a Manchester encoding scheme. Additionally, the Fieldbus protocol requires the Manchester encoded bitstream to be conveyed via the bus 30 using a signal having an approximately trapezoidal waveform with an amplitude of between about one and two volts peak-to-peak.

FIG. 5 is an exemplary circuit diagram that shows one manner in which several of the functional blocks within the multi-protocol smart field device 50 shown in FIG. 2 may be implemented. As shown in FIG. 5, the media access unit 110 may be implemented using an integrated circuit 200. By way of example only, the integrated circuit 200 is a uSAA22Q, which is commercially available from Yokagawa of Japan. A detailed description of the functions, features and application information related to the uSAA22Q may be found in widely available literature provided by Yokagawa.

In addition to performing the functions of the media access unit 110, the integrated circuit 200 also performs the function of the second filter block 56. The capacitors C1 and C2 (which are connected to the "SIGIN" and "HPF" terminals, respectively, of the uSAA22Q) are part of an active filter that may be adjusted to set a low cutoff frequency that is above the data transmission rate and frequency band associated with HART communications (i.e., above 2.2 kHz). While the integrated circuit 200 is described as being a uSAA22Q, other commercially available integrated circuit chips manufactured by companies such as for example, National Semiconductor, Siemens, etc. may be used instead. However, those skilled in the art will recognize that the functions of the integrated circuit 200 may be implemented in a variety of ways without departing from the scope of the invention. For example, the functions of the media access unit 110 and the second filter 56 may be implemented using discrete circuitry, including operational amplifiers, transistors, resistors, capacitors, etc. without departing from the scope of the invention.

FIG. 5 also shows exemplary implementations of the amplitude adjustment circuit 102, the bus driver 66 and a polarity protection circuit 202. Although these circuits are shown as being made of discrete active and passive components, these circuits could alternatively be implemented using circuitry integrated within a semiconductor chip. As shown in FIG. 5, the polarity protection circuit 202 may be implemented using a plurality of diodes D2, D3, and D5–D7 connected in a bridge configuration together with a transorb D4, which may be included to suppress potentially damaging transients that are conducted over the bus 30 to the inputs (i.e, the LOOP+ and LOOP– terminals) of the multi-protocol smart field device 50. As is also shown in FIG. 5, the bus driver 66 may implemented using a current sink transistor Q4 and a current mirror including transistors Q3 and Q4. Additionally, FIG. 5 shows the amplitude adjustment circuit 102 as being implemented using a passive resistor network (i.e., a voltage divider) including resistors Ra and Rb.

FIG. 6 is an exemplary graphical representation of the frequency response characteristics which may be used within the first and second filter blocks 54 and 56 shown in FIG. 2. As shown in FIG. 6, the first filter block 54 has a first frequency response characteristic 300 with a high cutoff frequency 302 and the second filter block 56 has a second frequency response characteristic 304 with a low cutoff frequency 306. As can been seen in FIG. 6, the frequencies or frequency band 308 associated with HART communications are within the pass-band of the first frequency response characteristic 300 and are substantially attenuated (e.g., about –40 dB) by the second characteristic 304 of the second filter block 56. Further, the frequency band 310 associated with Fieldbus communications is within the pass-band of the second response characteristic 304 of the second filter block 56 and is substantially attenuated (i.e., about –40 dB) by the first characteristic 300 of the first filter block 54. Of course, those skilled in the art will recognize that the filter characteristics 300 and 304 may be varied from those shown without departing from the scope of the invention. For example, more or less attenuation of Fieldbus signals in the first filter block 54 and/or more or less attenuation of HART signals in the second filter block 56 may be used. Further, the filter blocks 54 and 56 may be implemented in any conventional or any other manner using, for example, passive filtering techniques, active filtering techniques, etc., and signal amplitudes may be adjusted via the respective receiving circuitry, modem, media access unit, etc.

Although the multi-protocol smart field device is described herein as using two different protocols (e.g., Fieldbus and HART), more than two protocols may be used without departing from the scope of the invention. For example, the smart field device 50 shown in FIG. 2 could easily be adapted so that each of the communications interfaces 58 and 60 processes multiple protocols having identical physical layers. For instance, the second communications interface 60 could process both Fieldbus and Profibus signals, and the processor 62 could examine the format of the digital words received from the communications interface 60 to automatically determine or detect which protocol is being processed. Still further, additional communications interfaces could be added to the field device 50 to enable the field device to use more than two protocols.

Additionally, the protocols used within the multi-protocol field device described herein may be employed for a variety of different purposes, if desired. For example, the protocols may be used to carry out process control activities, configuration activities, testing activities, etc. Also, for example, each of the protocols may be used to carry out more than one type of activity. Thus, a given protocol may be used to carry out any desired combination of process control, configuration and testing activities.

If implemented in software, the functional blocks and methods discussed herein may be stored in any computer readable memory such as on a magnetic disk, a laser disk, or other storage medium, in a RAM or ROM of a computer, controller, field device, etc. Likewise, this software may be delivered to a user or a device via any known or desired delivery method including, for example, over a communication channel such as a telephone line, the Internet, etc.

While the invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A field device for use in a process control system having a primary digital data bus, comprising:
    a first communications interface communicatively coupled to the primary digital data bus, the first communications interface being adapted to process communications having a first protocol;
    a second communications interface communicatively coupled to the primary digital data bus, the second communications interface being adapted to process communications having a second protocol different from the first protocol wherein the first and second communications interface are coupled in parallel on the primary data bus such that the first or the second communications protocol can communicate directly on the primary data bus;
    a memory; and
    a processor communicatively coupled to the memory, the first communications interface, and the second communications interface, wherein the processor is programmed to process the communications having the first protocol and the communications having the second protocol.

2. The field device of claim 1, wherein the processor is further programmed to use the communications having the first protocol for process control and to use the communications having the second protocol for configuration of the field device.

3. The field device of claim 1, wherein the first communications interface is further adapted to process communications having a first frequency band and the second communications interface is further adapted to process communications having a second frequency band different from the first frequency band.

4. The field device of claim 3, further comprising a first filter coupled between the primary digital data bus and the first communications interface, wherein the first filter couples communications having the first frequency band and the first protocol to the first communications interface and substantially attenuates communications having the second frequency band and the second protocol.

5. The field device of claim 4, wherein the first filter has a high cutoff frequency that is less than the second frequency band.

6. The field device of claim 4, further comprising a second filter coupled between the primary digital data bus and the second communications interface, wherein the second filter couples the communications having the second frequency band and the second protocol to the second communications interface and substantially attenuates the communications having the first frequency band and the first protocol.

7. The field device of claim 6, wherein the second filter has a low cutoff frequency that is greater than the first frequency band.

8. The field device of claim 1, wherein the first protocol is a HART communication protocol and wherein the second protocol is a Fieldbus communication protocol.

9. The field device of claim 1, wherein the first communications interface includes a modem.

10. The field device of claim 9, wherein the first communications interface further includes an amplitude adjustment circuit coupled to an output of the modem.

11. The field device of claim 1, wherein the second communications interface includes a media access unit and a protocol conversion unit coupled to the media access unit.

12. The field device of claim 1, wherein the memory contains a first software routine for processing the communications having the first communication protocol and a second software routine for processing the communications having the second communication protocol.

13. A method of communicating with a field device coupled to a primary digital data bus, comprising the steps of:
    receiving communications having a first protocol in the field device via the primary digital data bus;
    receiving communications having a second protocol different from the first protocol in the field device via the primary digital data bus;
    processing the communications having the first protocol within a first communications interface communicatively coupled to the primary digital data bus; and
    processing the communications having the second protocol within a second communications interface communicatively coupled to the primary digital data bus wherein the first and second communications interface are coupled in parallel to the primary digital data bus such that the first or the second communication protocol can communicate directly on the primary data bus.

14. The method of claim 13, wherein the step of processing the communications having the first protocol within the first communications interface includes the step of using the communications having the first protocol for process control and wherein the step of processing the communications having the second protocol within the second communications interface includes the step of using the communications having the second protocol for configuration of the field device.

15. The method of claim 13, wherein the step of receiving the communications having the first protocol includes the step of receiving communications in a first frequency band and wherein the step of receiving the communications having the second protocol includes the step of receiving communications in a second frequency band different from the first frequency band.

16. The method of claim 15, further comprising the step of coupling the communications having the first frequency band and the first protocol to the first communications interface through a first filter that substantially attenuates the communications having the second frequency band and the second protocol.

17. The method of claim 16, wherein the step of coupling the communications having the first frequency band and the first protocol to the first communications interface through the first filter that substantially attenuates the communications having the second frequency band and the second protocol includes the step of establishing a high cutoff frequency in the first filter that is less than the second frequency band.

18. The method of claim 16, further comprising the step of coupling the communications having the second frequency band and the second protocol to the second communications interface through a second filter that substantially attenuates the communications having the first frequency band and the first protocol.

19. The method of claim 18, wherein the step of coupling the communications having the second frequency band and the second protocol to the second communications interface through the second filter that substantially attenuates the communications having the first frequency band and the first protocol includes the step of establishing a low cutoff frequency in the second filter that is greater than the first frequency band.

20. The method of claim 13, wherein the steps of receiving communications having the first protocol and communications having the second protocol different from the first protocol in the field device via the primary digital data bus includes the steps of using a HART communication protocol for one of the first and second protocols and using a Fieldbus communication protocol for the other one of the first and second protocols.

21. The method of claim 13, wherein the step of receiving communications having the second protocol different from the first protocol in the field device via the primary digital data bus includes the step of using a portable configuration tool proximate to the field device to send the communications having the second protocol.

22. The method of claim 21, wherein the step of using the portable configuration tool proximate to the field device to the send the communications having the second protocol includes the step of using a HART communicator.

23. A method of locally configuring a field device having a first communications interface for processing communications having a first protocol and a second communications interface for processing communications having a second protocol using a portable configuration tool wherein the first communications interface and the second communications interface are operatively coupled to a primary digital data bus, the method comprising the steps of:

communicatively coupling the portable configuration tool to the field device; and sending configuration information from the portable configuration tool to the field device using the second communication protocol wherein the first and second communications interface are coupled in parallel to the primary digital data bus such that the first or the second communication protocol can communicate directly on the primary data bus.

24. The method of claim 23, wherein the step of communicatively coupling the portable configuration tool to the field device includes the step of communicatively coupling the portable configuration tool to a field device that uses a Fieldbus protocol to communicate process control information.

25. The method of claim 23, wherein the step of sending configuration information from the portable configuration tool to the field device using the second communication protocol includes the step of using a HART communication protocol to send the configuration information.

26. A field device for use in a process control system having a digital data bus, comprising:

a first communications interface communicatively coupled to the digital data bus that is adapted to process communications having a first protocol;

a second communications interface communicatively coupled to the digital data bus that is adapted to process communications having a second protocol different from the first protocol;

a memory; and a processor communicatively coupled to the memory, the first communications interface and the second communications interface, wherein the processor is programmed to process the communications having the first protocol and the communications having the second protocol, the processor being further programmed to use the communications having the first protocol for process control and to use the communications having the second protocol for configuration of the field device.

27. The field device of claim 26, wherein the first communications interface is further adapted to process communications having a first frequency band and the second communications interface is further adapted to process communications having a second frequency band different from the first frequency band.

28. The field device of claim 27, further comprising a first filter coupled between the digital data bus and the first communications interface, wherein the first filter couples communications having the first frequency band and the first protocol to the first communications interface and substantially attenuates communications having the second frequency band and the second protocol.

29. A field device for use in a process control system having a digital data bus, comprising:

a first communications interface communicatively coupled to the digital data bus that is adapted to process communications having a first protocol;

a second communications interface communicatively coupled to the digital data bus that is adapted to process communications having a second protocol different from the first protocol;

a memory; and a processor communicatively coupled to the memory, the first communications interface and the second communications interface, wherein the processor is programmed to process the communications having the first protocol and the communications having the second protocol, the first communications interface being further adapted to process communications having a first frequency band and the second communications interface is further adapted to process communications having a second frequency band different from the first frequency band.

30. The field device of claim 29, further comprising a first filter coupled between the digital data bus and the first communications interface, wherein the first filter couples communications having the first frequency band and the first protocol to the first communications interface and substantially attenuates communications having the second frequency band and the second protocol.

31. A method of communicating with a field device coupled to a digital data bus, comprising the steps of:

receiving communications having a first protocol in the field device via the digital data bus;

receiving communications having a second protocol different from the first protocol in the field device via the digital data bus;

processing the communications having the first protocol within a first communications interface communicatively coupled to the digital data bus wherein processing the first protocol includes using the communications having the first protocol for process control; and processing the communications having the second protocol within a second communications interface communicatively coupled to the digital data bus wherein processing the second protocol includes using the communications having the second protocol for configuration of the field device.

32. A method of communicating with a field device coupled to a digital data bus, comprising the steps of:

receiving communications having a first protocol in the field device via the digital data bus wherein receiving the communications having the first protocol includes receiving communications in a first frequency band;

receiving communications having a second protocol different from the first protocol in the field device via the digital data bus wherein receiving the communications having the second protocol includes receiving communications in a second frequency band different from the first frequency band;

processing the communications having the first protocol within a first communications interface communicatively coupled to the digital data bus; and processing the communications having the second protocol within a second communications interface communicatively coupled to the digital data bus.

* * * * *

UNITED STATES PATENT AND TRADEMARK OFFICE
CERTIFICATE OF CORRECTION

PATENT NO. : 6,959,356 B2  Page 1 of 1
APPLICATION NO. : 09/918258
DATED : October 25, 2005
INVENTOR(S) : Steve A. Packwood et al.

Figure 5A:
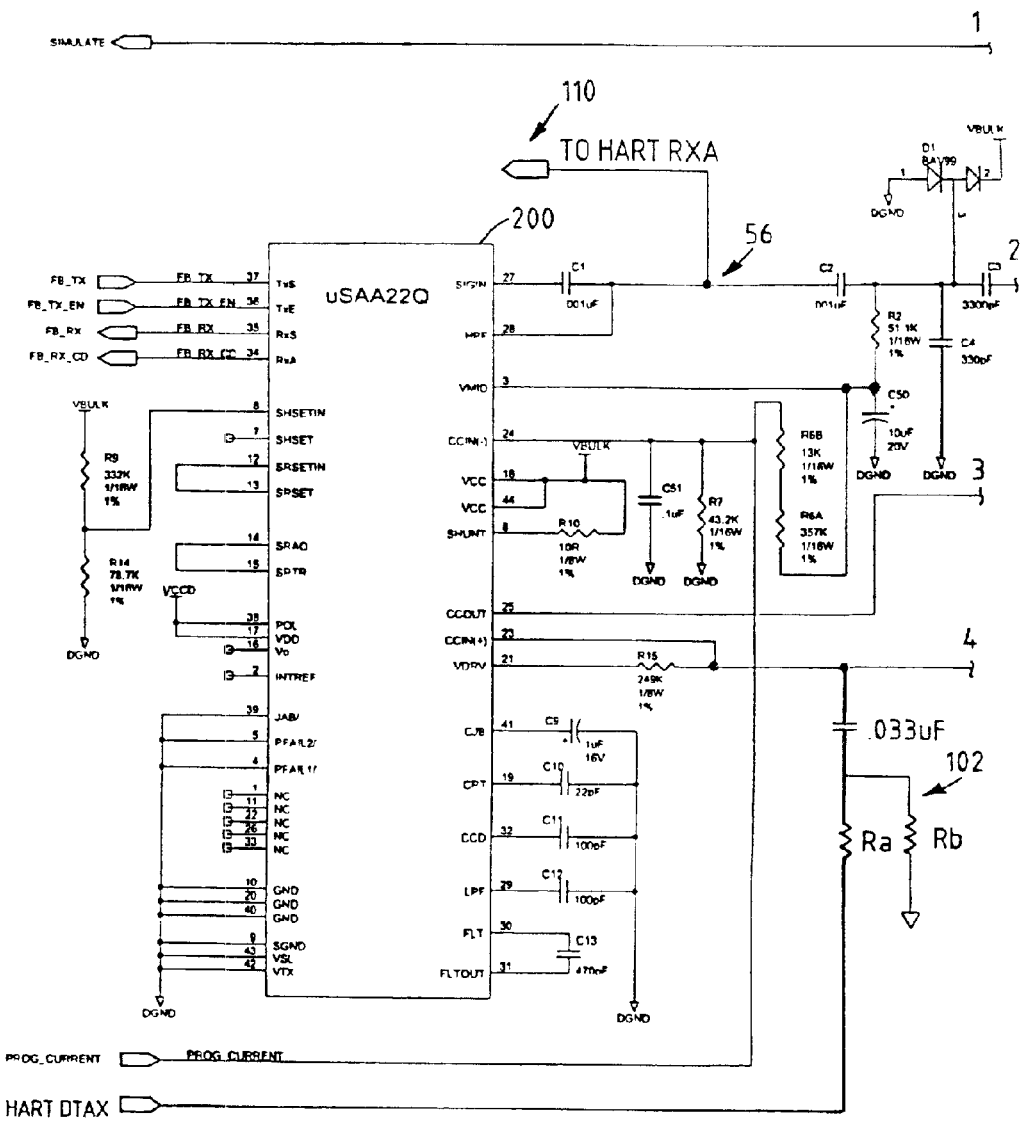
FIG. 5 is an exemplary circuit diagram that shows one manner in which several of the functional blocks within the multi-protocol smart field device shown in FIG. 3 may be implemented.
Figure 5B:
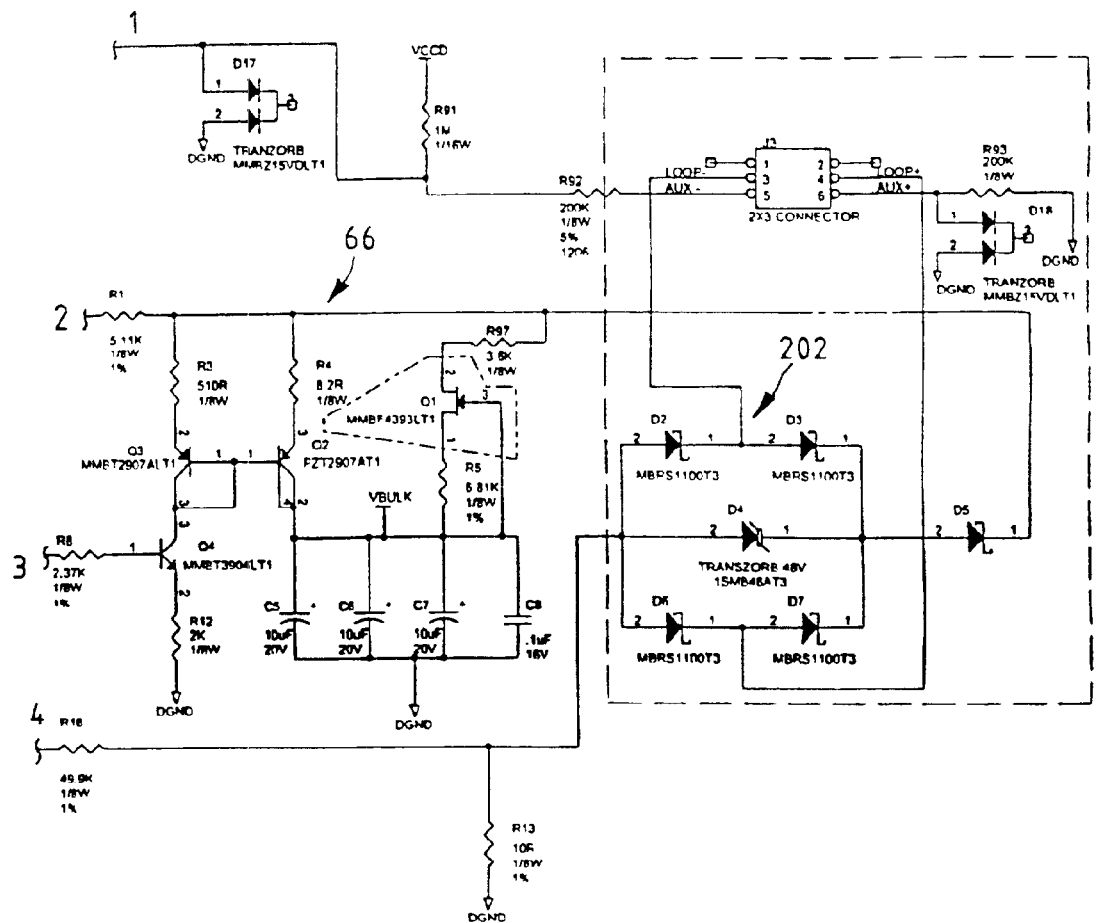

It is certified that error appears in the above-identified patent and that said Letters Patent is hereby corrected as shown below:

At Column 3, line 66, "FIG. 5 is" should be -- FIG. 5A and FIG. 5B are --.

At Column 3, line 66, "diagram that shows" should be -- diagrams that show --.

At Column 9, line 41, "FIG. 5" should be -- FIG. 5A --.

At Column 9, line 44, "FIG. 5" should be -- FIG. 5A --.

At Column 10, line 4, "FIG. 5" should be -- FIG. 5B --.

At Column 10, lines 4-5, "of the amplitude adjustment circuit 102, the" should be -- of the --.

At Column 10, line 10, "FIG. 5" should be -- FIG. 5B --.

At Column 10, line 16, "FIG. 5" should be -- FIG. 5B --.

At Column 10, line 17, "may implemented" should be -- may be implemented --.

At Column 10, line 19, "FIG. 5" should be -- FIG. 5A --.

At Column 10, line 30, "been" should be -- be --.

At Column 13, lines 35-36, "to the send" should be -- to send --.

At Column 13, line 51, "interface" should be --interfaces --.

Signed and Sealed this

Twenty-sixth Day of June, 2007

JON W. DUDAS
*Director of the United States Patent and Trademark Office*